J. WATCHMAN.
Bending Metal Plates.
No. 3,116.
Patented June 1, 1843.
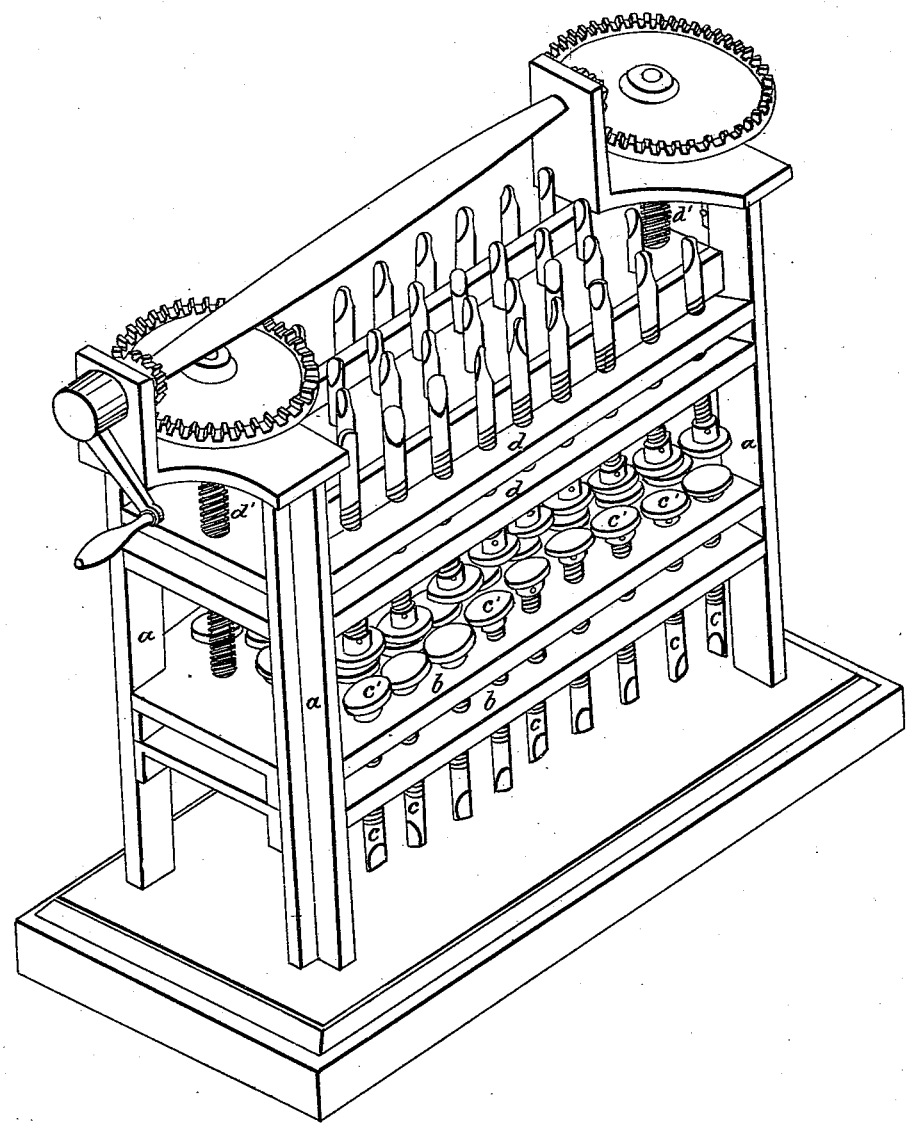

UNITED STATES PATENT OFFICE.

JOHN WATCHMAN, OF BALTIMORE, MARYLAND.

MACHINE FOR BENDING SHEET OR PLATE IRON.

Specification of Letters Patent No. 3,116, dated June 1, 1843.

*To all whom it may concern:*

Be it known that I, JOHN WATCHMAN, of the city of Baltimore and State of Maryland, have invented a new and Improved Machine for Bending, Curving, and Twisting Iron Plates; and I do hereby declare that the following is a full, clear, and exact description thereof, reference being had to the accompanying drawing, which forms a part of this specification, in which the machine is represented in isometrical projection.

The nature of my invention consists in the combination of two platforms or plates in which a number of screws are inserted on the ends of which are movable pieces shaped like hammer faces; the screws being susceptible of forming any curve by being elevated or depressed, molds or wooden curves being used to adjust them by.

The frame consists of four iron uprights ($a$) properly braced, in which the lower platform ($b$) is permanently fixed, with the movable hammer-faced pieces ($c'$) on the screws ($c$) upward. Above this the upper platform ($d$) is placed and parallel with it this is made to move up and down by means of screws ($d'$) at each end geared together or any other apparatus that will effect the object. This platform has an equal number of screws as the lower one which stands directly opposite to them, the faces of the movable pins coming in contact with each other when the upper plate or platform is lowered.

If sheets or plates or metal are wanted for covering a vessel, I take a frame of wood or other material, of the length and breadth of the sheet wanted, and place it perpendicularly opposite the place where the sheet is to be attached. I then take my "spiling" or distance at the four different corners or extremities of the frame, and at as many other points as I think necessary and mark them on the frame in inches or parts of an inch, as its distance is at that point from the frame or ribs of the vessel. After which I take my frame with all the dimensions upon it, and place it for my guide near the machine, in a horizontal position, to correspond with my lower platform. I then proceed to set my screws ($c$) to the same distance of spilings as marked on my board and adjust them by wooden molds made for that purpose, so as to make regular curve lines from one extremity to the other of the plate to be bent. After all the screws in the lower platform are set and regulated, the upper platform is run down, till the most elevated screws in the lower one touch the opposite ones in it; the other screws of the upper platform are then screwed down until they all have a bearing on the lower ones; and my shape or mold for the metal plate is then completed. The upper platform is then raised above the other sufficiently to admit the sheet metal (either hot or cold) between them, when it is again brought down with great expedition and power upon the lower screws, and the impression or form of the sheet is completed and ready to fit the place for which it was intended without further alteration.

What I claim as my invention and desire to secure by Letters Patent is—

The combination of the two parallel platforms ($b$, and $d$,) having series of screws in them constructed and arranged in the manner and for the purpose herein described. I also claim in combination with the screws in the platforms ($b$ and $d$) the movable hammer-faced pieces ($c'$) which can assume the line of the curve to be formed by the machine as herein set forth.

JOHN WATCHMAN.

Witnesses:
   IA. P. HEATH,
   JOS. TURNER, Jr.,
   THOMAS WILDER,